United States Patent [19]
Yoshida

[11] Patent Number: 5,748,714
[45] Date of Patent: May 5, 1998

[54] DATA COMMUNICATION APPARATUS FOR INFORMING A DESTINATION OF PERIODIC COMMUNICATION

[75] Inventor: Takehiro Yoshida, Tokyo, Japan

[73] Assignee: Canon Kabushiki Kaisha, Tokyo, Japan

[21] Appl. No.: 758,467

[22] Filed: Dec. 2, 1996

Related U.S. Application Data

[63] Continuation of Ser. No. 188,840, Jan. 31, 1994.

[30] Foreign Application Priority Data

Feb. 1, 1993 [JP] Japan .................. 5-014856

[51] Int. Cl.⁶ .................................. H04M 11/00
[52] U.S. Cl. ...................... 379/100.06; 358/438
[58] Field of Search ................. 379/100, 96–98, 379/93, 100.01, 100.06, 100.09, 100.14, 100.15, 100.17, 93.17, 93.28, 93.01; 358/400, 402, 407, 434–436, 438–440, 442, 468

[56] References Cited

U.S. PATENT DOCUMENTS

| | | | |
|---|---|---|---|
| 4,432,020 | 2/1984 | Onose et al. | 379/100 |
| 4,642,697 | 2/1987 | Wada | 379/100 |
| 4,785,355 | 11/1988 | Matsumoto | 379/100 |
| 5,093,857 | 3/1992 | Yoshida et al. | 379/100 |
| 5,127,047 | 6/1992 | Bell et al. | 379/100 |
| 5,175,634 | 12/1992 | Matsuzaki | 379/100 |
| 5,175,760 | 12/1992 | Ohashi et al. | 379/100 |
| 5,283,665 | 2/1994 | Ogata | 358/434 |
| 5,367,564 | 11/1994 | Sutoh et al. | 379/100 |
| 5,384,830 | 1/1995 | Ide | 379/100 |

FOREIGN PATENT DOCUMENTS

| | | | |
|---|---|---|---|
| 3-52359 | 3/1991 | Japan . | |
| 4-170157 | 6/1992 | Japan . | |
| 4-291877 | 10/1992 | Japan | 379/100 |
| 4-354261 | 12/1992 | Japan | 379/100 |

*Primary Examiner*—Wing F. Chan
*Attorney, Agent, or Firm*—Fitzpatrick, Cella, Harper & Scinto

[57] ABSTRACT

A data communication apparatus having a periodic communication mode comprises a circuit for informing to a destination station of the selection of the periodic communication mode when the periodic communication mode is selected to conduct data communication in the periodic communication mode and a circuit for indicating the reception of the notice that the periodic communication is being conducted when said notice is received.

18 Claims, 10 Drawing Sheets

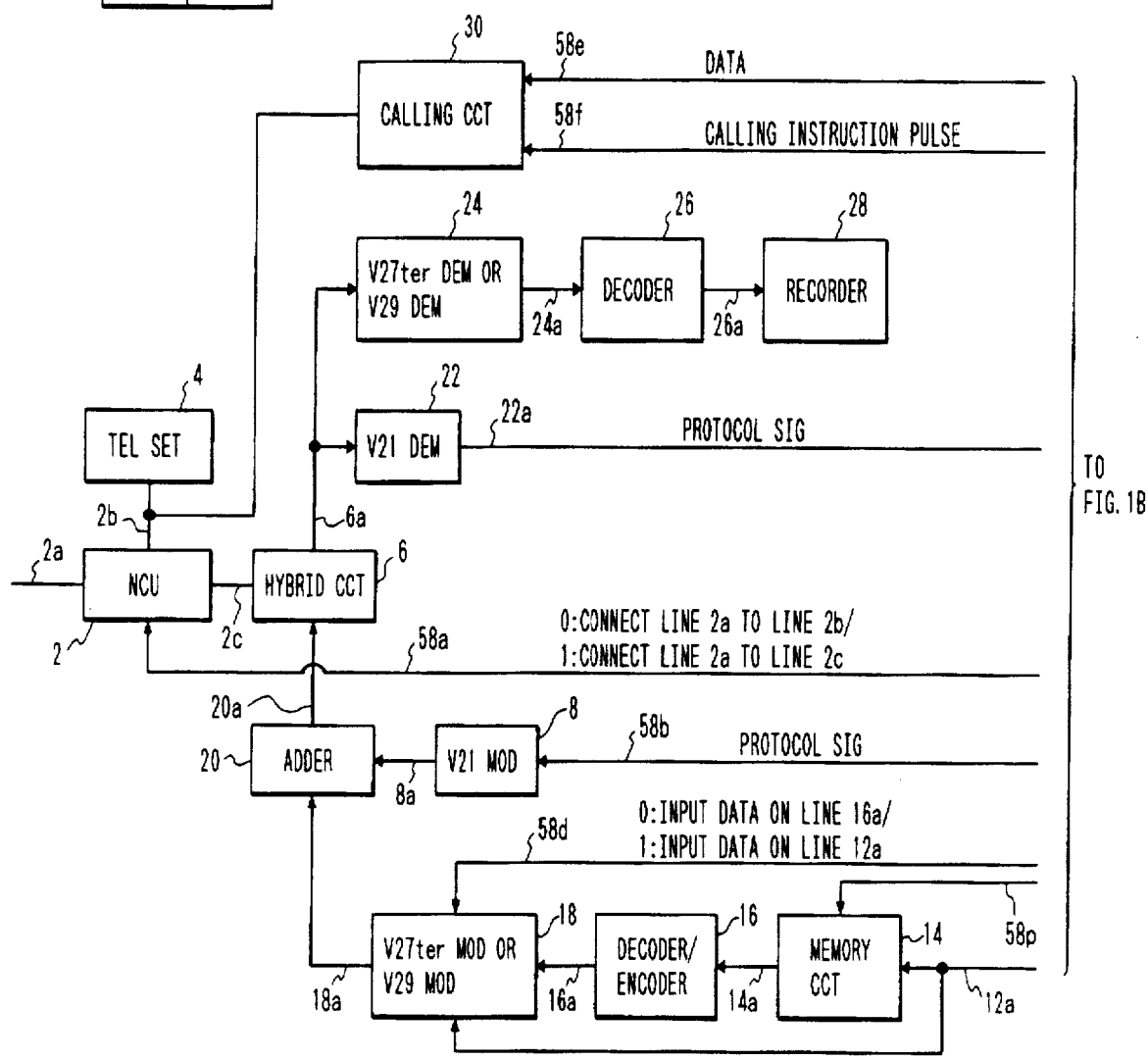

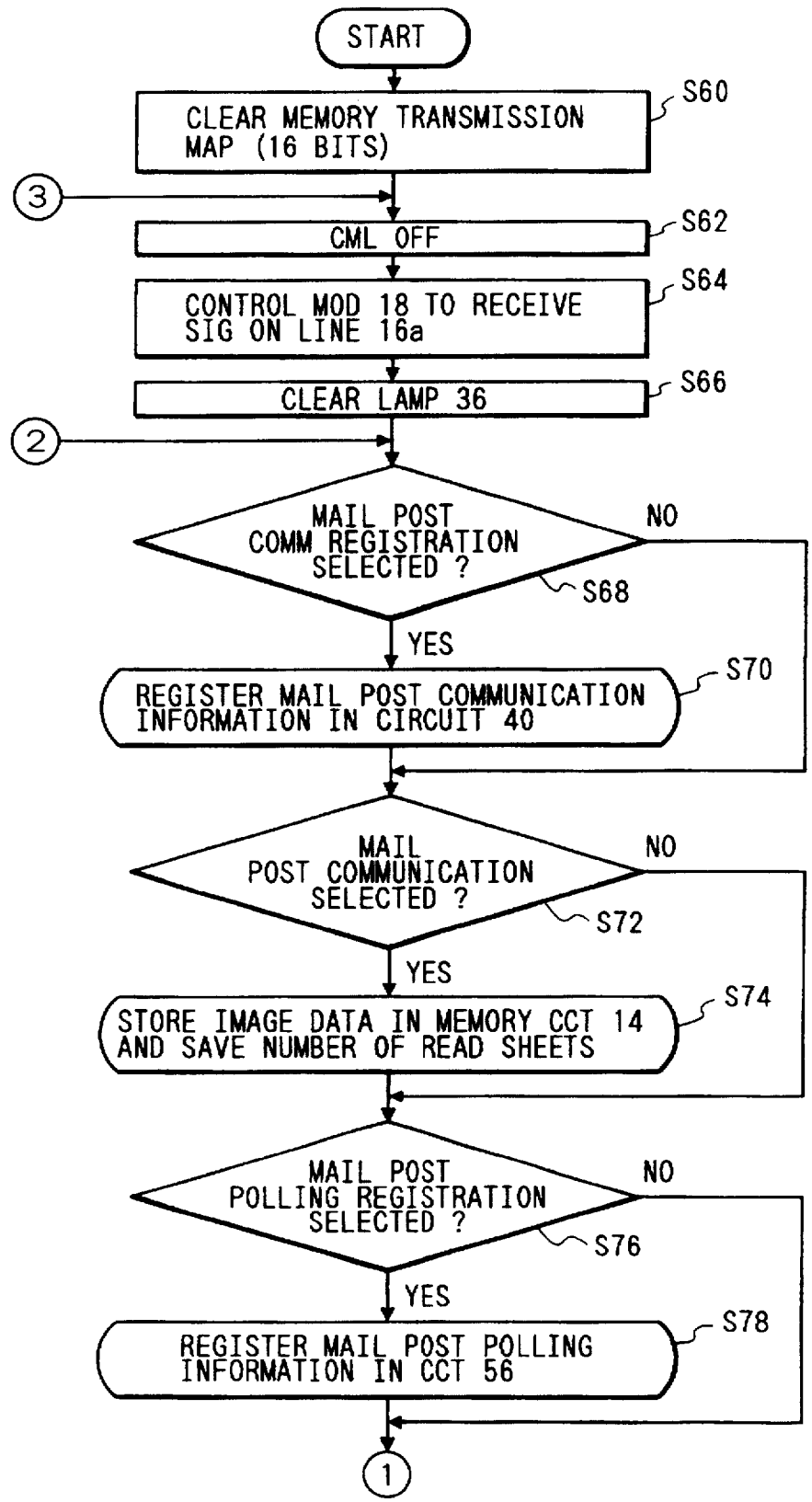

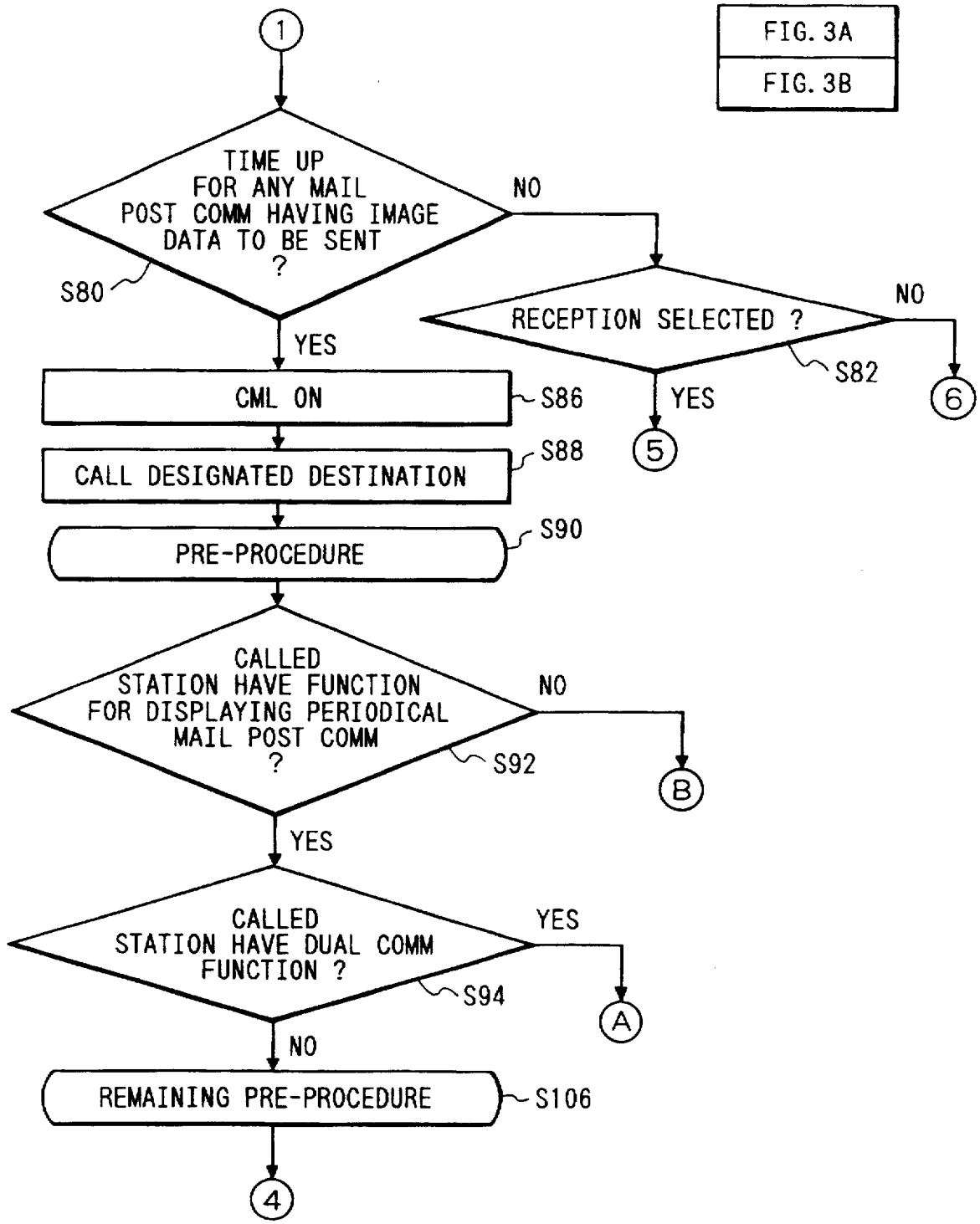

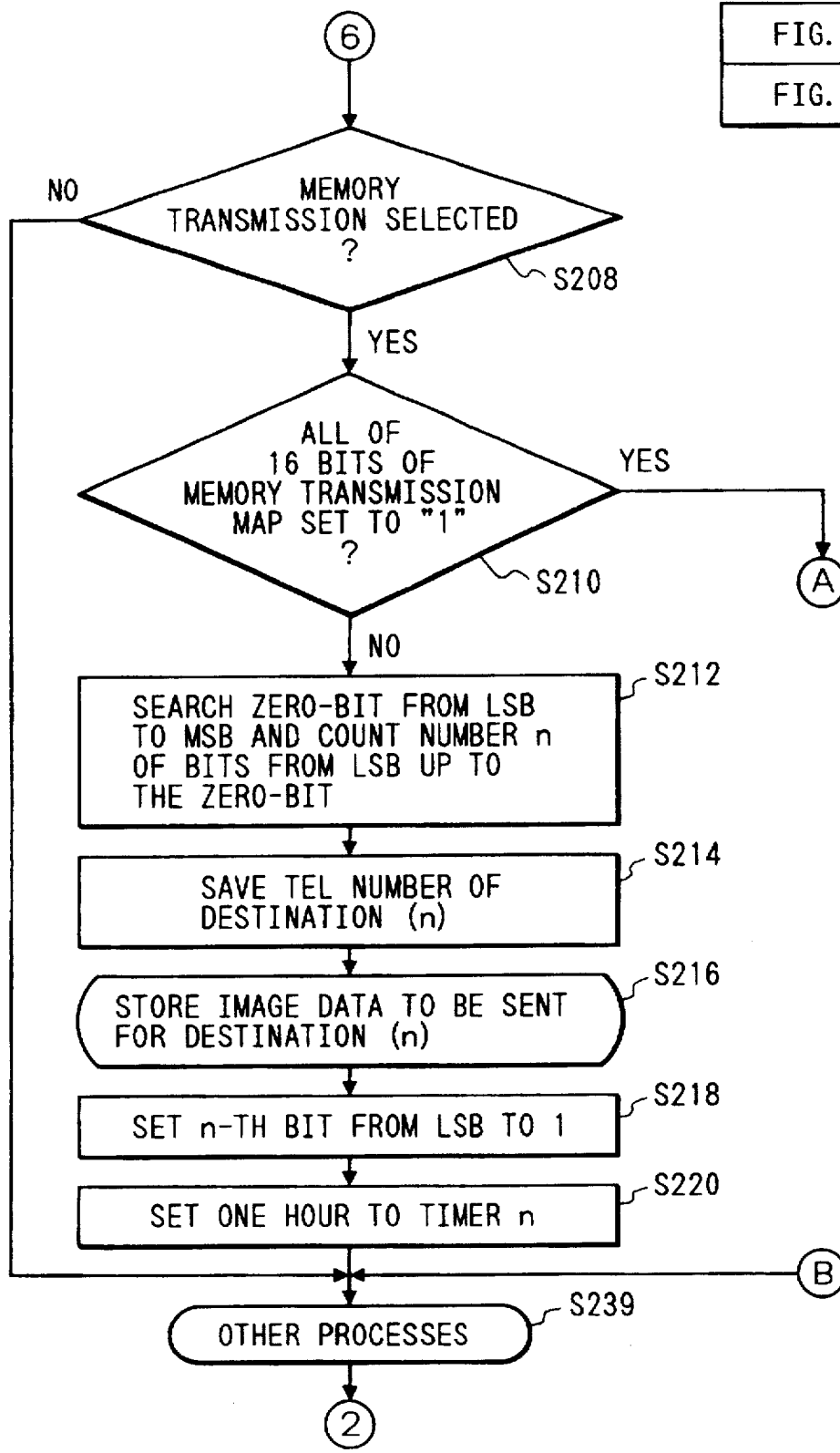

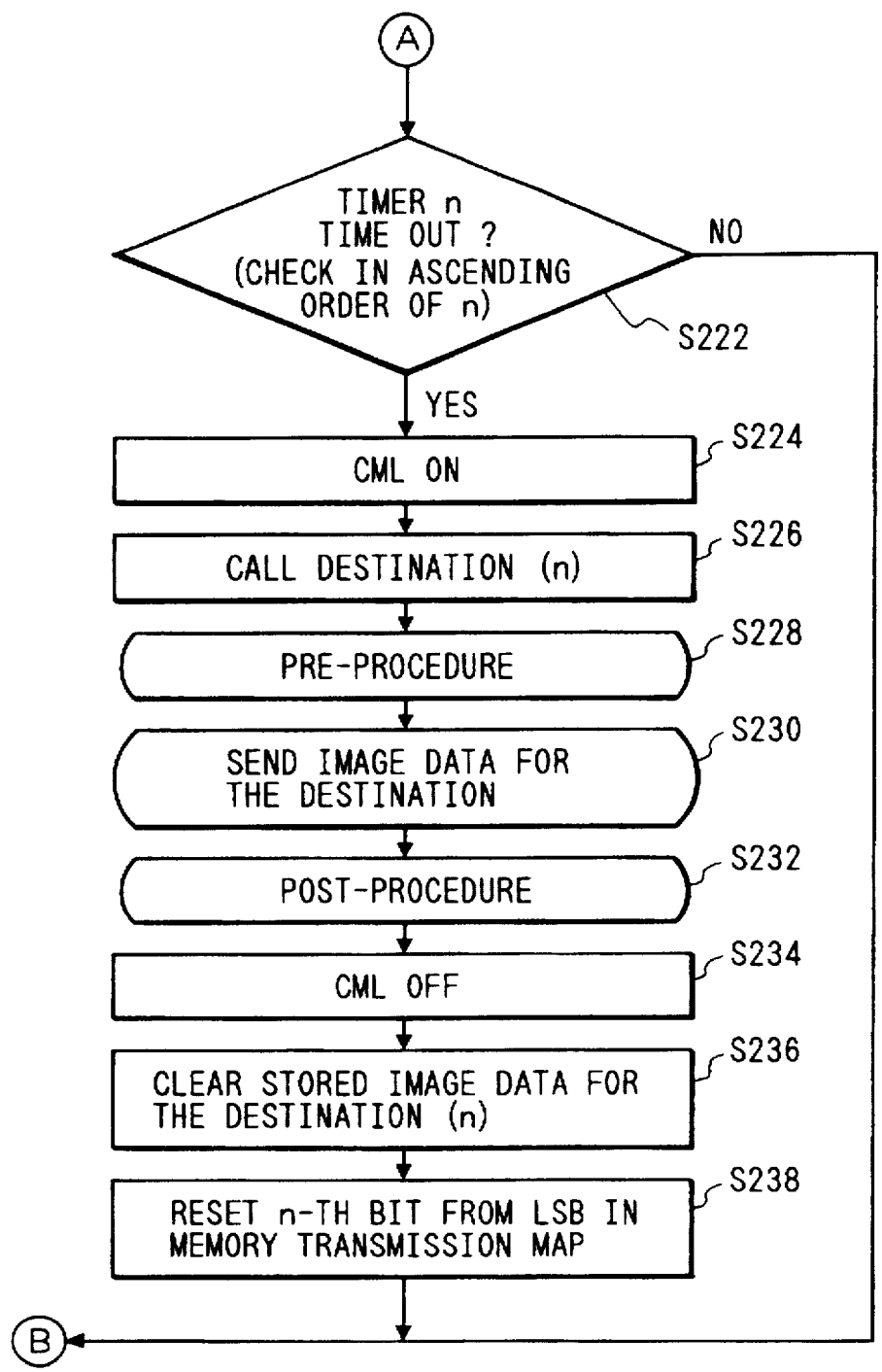

DATA COMMUNICATION APPARATUS FOR INFORMING A DESTINATION OF PERIODIC COMMUNICATION

This application is a continuation of application Ser. No. 08/188,840 filed Jan. 31, 1994.

BACKGROUND OF THE INVENTION

1. Field of the Invention

The present invention relates to a data communication apparatus, and more particularly to a data communication apparatus having an automatic communication function such as a time specified transmission.

2. Related Background Art

As a prior art apparatus of this type, a facsimile apparatus has been known. In automatic communication in the facsimile apparatus, a mail post communication has been known, in which communication is periodically made to a registered destination station if transmission information has been stored in a memory at a preset time.

When the mail post communication is conducted, a receiving station periodically receives information at the same time every day. However, if the receiving station is transmitting long information at that time, the receiving station is busy and the mail post communication is not attained.

SUMMARY OF THE INVENTION

It is an object of the present invention to improve a data communication apparatus in the light of the above problem.

It is another object of the present invention to provide a data communication apparatus for conducting periodic communication, including means for informing to a destination station of the periodic communication so that the destination station can recognize the periodic communication.

It is still another object of the present invention to provide a data communication apparatus for conducting the periodic communication, which can receive data from a destination station during the periodic transmission.

It is still another object of the present invention to provide a data communication apparatus for receiving periodic communication from a sending station, in which communication with other station is inhibited at a time when the periodic communication from the sending station is to be conducted.

It is still another object of the present invention to provide a data communication apparatus for receiving periodic communication from a sending station, which calls the sending station and sends data to the sending station if the priodic communication is not made from the sending station at a scheduled time and there is data to be sent to the sending station.

Other objects of the present invention will be apparent from the following detailed description of the invention and the drawings.

BRIEF DESCRIPTION OF THE DRAWINGS

FIG. 2 shows a flow chart of a control operation of a control circuit of the embodiment, FIG. 3, consisting of FIGS. 3A and 3B, shows a flow chart of a control operation of a control circuit of the embodiment, FIG. 4, consisting of FIGS. 4A and 4B, shows a flow chart of a control operation of a control circuit of the embodiment, FIG. 5, consisting of FIGS. 5A and 5B, shows a flow chart of a control operation of a control circuit of the embodiment.

Figure 1B:
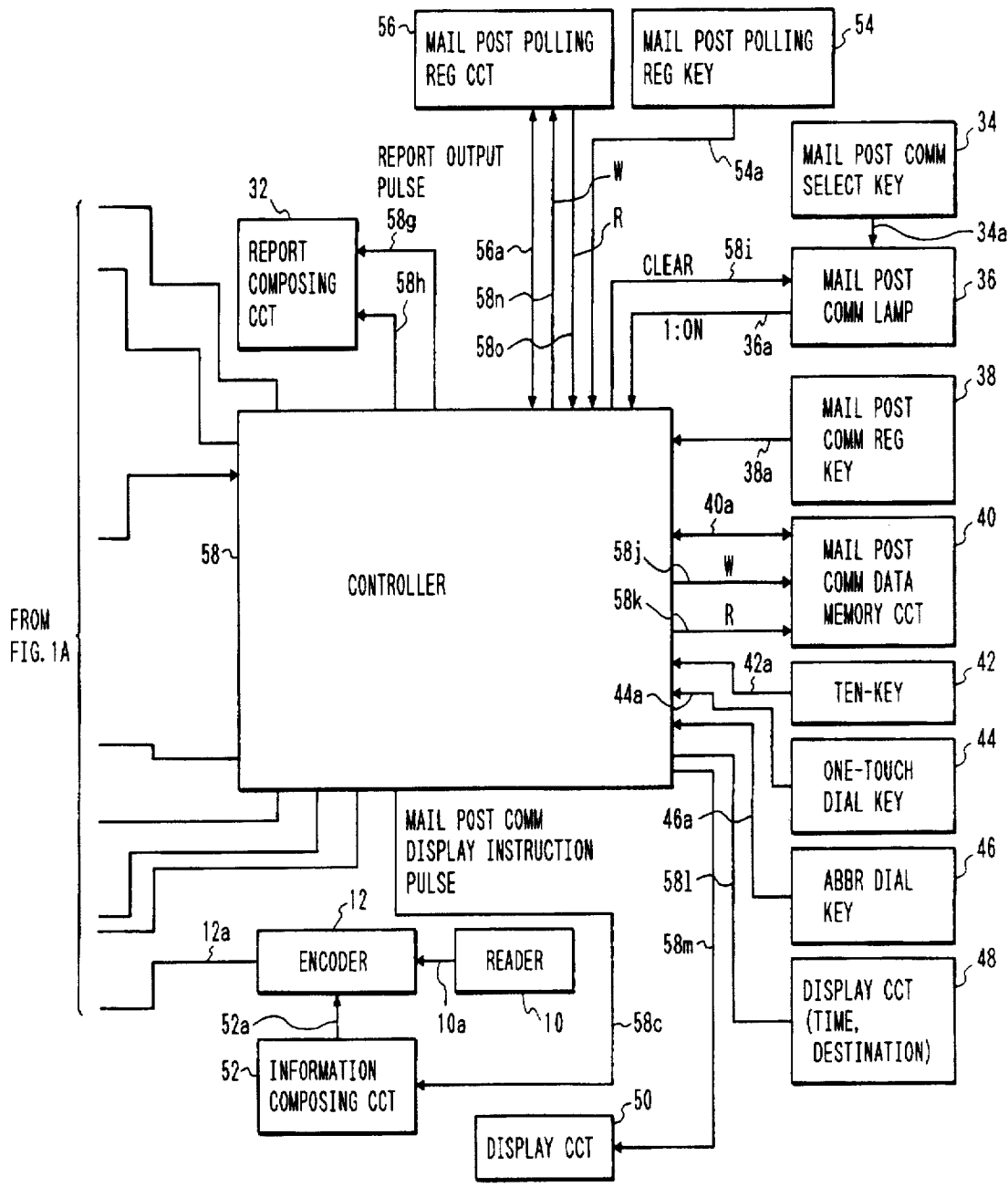
FIG. 1, consisting of FIGS. 1A and 1B, shows a block diagram of a configuration of a facsimile apparatus in accordance with one embodiment of the present invention.

DETAILED DESCRIPTION OF THE PREFERRED EMBODIMENTS (Embodiment 1)

Referring to the drawings, one embodiment of the present invention is explained.

FIGS. 1A and 1B show a block diagram of a configuration of a facsimile apparatus in accordance with the pre sent invention.

In FIGS. 1A and 1B, numeral 2 denotes a network control unit (NCU) for connecting a telephone network to a terminal of a line thereof for data communication to conduct connection control of the telephone network, switch to a data communication line and hold a loop. A signal line $2a$ is a telephone line. The NCU 2 receives a signal on a signal line $58a$ and if a signal level thereof is "0", it connects the telephone line to a telephone set, that is, it connects the signal line $2a$ to a signal line $2b$. If the signal level on the signal line $58a$ is "11", it connects the telephone line to a facsimile apparatus, that is, it connects the signal line $2a$ to a signal line $2c$. In a normal state, the telephone line is connected to the telephone set.

Numeral 4 denotes a telephone set. Numeral 6 denotes a hybrid circuit for separating a signal of a transmission unit and a signal of a receiving unit. A transmission signal on a signal line $20a$ is sent to the telephone line $2a$ over the signal line $2c$ through the NCU 2. A signal sent from a sending station is supplied to a signal line $6a$ through the NCU 2 and the signal line $2c$.

Numeral 8 denotes a modulator which modulates a signal in accordance with the known CCITT Recommendation V21. The modulator 8 receives a protocol signal on the signal line $58a$, modulates it and outputs modulated data to a signal line $8a$.

Numeral 10 denotes a read circuit which sequentially reads one line of image signal along a main scan direction from a document sheet to be transmitted to generate a signal train representing white and black values. A black and white binary signal train produced by an image pickup element such as a CCD (charge coupled device) and an optical system is supplied to a signal line $10a$.

Numeral 12 denotes an encoder which receives the read data on the signal line $10a$ and information "Periodic mail post communication at 9:20 (daily)" on the signal line $52a$ and supplies coded (MH (modified Huffman) coded or MR (modified READ) coded) data to a signal line $12a$.

Numeral 14 denotes a memory which stores the coded data on the signal line $12a$ under the control of a signal line $58p$ and supplies the information stored therein to a signal line $14a$ under the control of the signal line $58p$.

Numeral 16 denotes an encoder/decoder which receives the coded data on the signal line $14a$, decodes it to convert it to raw data, reencodes it in accordance with a function (a size of a record sheet, a line density, etc.) of a destination station, and supplies the encoded data to a signal line $16a$.

Numeral 18 denotes a modulator which modulates a signal in accordance with the known CCITT Recommendation V27 ter (differential phase modulation) or V29 (quadrature modulation). The modulator 18 receives the signal on the signal line $58d$ and if the signal level thereof is "0", it receives the signal on the signal line 16a, and if the signal level on a signal line 58d is "1", it receives the signal on the signal line 12a, modulates it and supplies the modulated data to a signal line 18a.

Numeral 20 denotes an adder which receives signals on the signal line 8a and the signal line 18a and supplies the sum to the signal line 20a.

Numeral 22 denotes a demodulator which demodulates a signal in accordance with the known CCITT Recommendation V21. The demodulator 22 receives a signal on the signal line 6a, modulates it by V21, and supplies the demodulated data to a signal line 22a.

Numeral 24 denotes a demodulator which demodulates a signal in accordance with the known CCITT Recommendation V27 ter (differential phase modulation) or V29 (quadrature modulation). The demodulator 24 receives a signal on the signal line 6a, demodulates it and supplies the demodulated data to a signal line 24a.

Numeral 26 denotes a decoder which receives a signal on the signal line 24a, supplies the decoded (MH (modified Huffman) decoded or MR (modified READ) decoded) data to a signal line 26a.

Numeral 28 denotes a record circuit which receives the decoded data on the signal line 26a and sequentially records it line by line.

Numeral 30 denotes a call circuit which receives dial information supplied to a signal line 58e when a calling pulse is generated on a signal line 58f and sends a selection signal to the signal line 2b.

Numeral 32 denotes a circuit which recieves a communication result report or a communication management report on a signal line 58h and generates a communication result report or a communication control report, when a report output pulse is generated on a signal line 58g.

Numeral 34 denotes a mail post communication selection button used to select the mail post communication. When the button is depressed, a depression pulse is generated on a signal line 34a.

Numeral 36 denotes a mail post communication lamp which is turned on when the mail post communication is conducted. The lamp is turned off when a clear pulse is generated on a signal line 58i and repeats turn-on and turn-off each time a pulse is generated on the signal line 34a. The mail post communication lamp 36 outputs a signal of a signal level "0" (low level) to a signal line 36a when the lamp is turned off, and outputs a signal of a signal level "1" (high level) to the signal line 36a when the lamp is turned on.

Numeral 38 denotes a button for registering the mail post communication. Specifically, it is a mail post communication registration button which corresponds to the mail post communication number and is used to register a destination station to be called, a communication time and an implementation condition (one time only, or daily). When the button is depressed, a depression pulse is generated on a signal line 38a.

Numeral 40 denotes a circuit which corresponds to the mail post communication number and stores the mail post communication time, the implementation condition (one time only, or daily) and the destination station of the mail post communication. The mail post communication numbers 1 to 5 are assumed in the present embodiment. The mail post communication time, the implementation condition and the mail post communication destination station are collectively referred to as mail post communication data. When the mail post communication time, the implementation time (one time only or daily) and the mail post communication destination station corresponding to the mail post communication number are to be stored in the circuit 40, the mail post communication number and the mail post communication data are supplied to a signal line 40a. The output format may comprise the mail post communication number n (n is 1 to 5), followed by a space, followed by the mail post communication time hh:mm (e.g., 9:00) corresponding to the mail post communication number n, followed by a space, followed by the implementation condition (1 for one time only and 2 for daily), followed by a space, and followed by the mail post communication destination station (e.g., 03-758-1111). After the mail post communication number and the mail post communication data have been supplied, a write pulse is generated on the signal line 58i. When the information corresponding to the mail post communication number n stored in the circuit 40 is to be read, the mail post communication number n (n is 1 to 5) is supplied to the signal line 40a and a read pulse is supplied to a signal line 58k. Then, the circuit 40 supplies the mail post communication time, (a space), the implementation condition, (a space) and the mail post communication destination station stored therein corresponding to the mail post communication number n to the signal line 40a.

Numeral 42 denotes a ten-key. Depressed ten-key information is supplied to a signal line 42a.

Numeral 44 denotes a one-touch dial. Depressed one-touch dial information is supplied to a signal line 44a.

Numeral 46 denotes a preset dial (or abbreviation dial) which, when depressed, generates a depression pulse on a signal line 46a. When the preset dialing (or abbreviation dialing) is to be conducted, the preset dial is depressed and two-digit numeric information is additionally entered by the ten-key.

Numeral 48 denotes a circuit which indicates a message "Periodic mail post reception. Time hh:mm (for example, 9:00). The destination station telephone number (for example, 03-758-1111)", in response to the input of the information on the signal line 58l.

Numeral 50 denotes a circuit which indicates a message "Mail post polling is available. Please use it for periodic trasmission to a destination station." in response to the input of the information on the signal line 58m. The mail post polling permits dual transmission and reception (parallel transmission and reception) and transmits information to the destination station by using a reverse channel of the line when periodic mail post communication is conducted from the destination station.

Numeral 52 denotes a circuit which supplies information "Periodic mail post communication at hh:mm for example, 9:00)" to a signal line 52a as dot information when a pulse is generated on a signal line 58c.

Numeral 54 denotes a circuit for registering the mail post polling communication. Specifically, it is a mail post polling communication registration button which is used to register the destination station telephone number and an approximate time of the mail post communication corresponding to the mail post polling transmission number. When the registration button is depressed, a depression pulse is generated on a signal line 54a.

Numeral 56 denotes a memory circuit for storing the destination station telephone number and the approximate time of the mail post communication corresponding to the mail post polling transmission number. The mail post polling communication numbers 1 to 5 are assumed in the present embodiment. When the destination station telephone number and the approximate time of the mail post communication permitted to the corresponding mail post polling transmission number are to be stored in the circuit 56, the mail post polling communication number n (n is 1 to 5), a space, the permitted telephone number for example, 03-758-1111), a space and the approximate mail post communication time hh:mm (for example, 9:00) are supplied to the signal line 56a, and a write pulse is generated on a signal line 58n. When the information corresponding to the mail post polling communication number n stored in the circuit 56 is to be read, the mail post polling communication number n (n is 1 to 5) is supplied to the signal line 56a and a read pulse is generated on a signal line 58o. Then the circuit 56 supplies the permitted destination station telephone number, a space and the approximate time of the mail post communication to the signal line 56a.

Numeral 58 denotes a control circuit for the facsimile apparatus which is operable in a dual mode. In a receiving mode, it informs to a sending station of the capability of dual transmission and reception. In a receiving mode, it informs to a receiving station of the capability of dual mode operation, and if a periodic communication is selected (specifically, the mail post communication to be conducted at a predetermined time daily is selected), it informs it (the telephone number of the transmitting station and the daily communication time) to the destination receiving station. When the receiving station receives the notice of the periodic communication (specifically, the notice of the mail post communication conducted at the predetermined time daily), it indicates the mail post reception (including the daily reception time and the sending station telephone number) and also indicates the availability of the mail post polling. If an operator selects the mail post polling communication for the indication of the availability of the mail post polling, the information (the destination station telephone number permitted to the mail post communication and the approximate time of the mail post communication) is registered. When the mail post reception is conducted, the sending station telephone number and the telephone number stored in the circuit 56 are compared and if they match, the mail post polling transmission is conducted. The control circuit 58 primarily conducts the above control.

FIGS. 2 to 6 show flow charts of control operations of the control circuit 58 of the present embodiment.

In the facsimile apparatus of the present embodiment, up to 16 reservations for the stored transmission may be stored. When the stored transmission reservation is selected, the destination station telephone numbers corresponding to 16 stations are stored, a document sheet is read, the image data is stored in the memory, and a timer is started. The stored transmission is not conducted until one hour is elapsed. If a message is received from the destination station reserved for the stored transmission within one hour, it is confirmed if the destination station is operable in the dual mode and the transmission in parallel with the reception is conducted.

In a step S60, 16 bits of the stored transmission reservation map are cleared (set to 00000000 00000000B).

In a step S62, a signal of the signal level "0" is supplied to the signal line 58a, and a CML is turned off. In a step S64, a signal of the signal level "0" is supplied to the signal line 58d and the V27 ter or V29 modulator receives the signal on the signal line 16a.

In a step S66, a clear pulse is generated on the signal line 58i to turn off the mail post communication lamp 36.

In a step S68, whether the mail post communication registration has been selected or not is determined. The mail post communication registration in a step S70 is conducted by registering the mail post communication time, the implementation condition (one time only or daily) and the mail post communication destination station which correspond to a mail post communication number. When the mail post communication registration button 38 is depressed, message "Enter mail post communication number." is indicated on a display unit, not shown. An operator enters the number 1 to 5 by the ten-key 42 to enter the mail post communication number. Then, a message "Enter time." is indicated on the display unit. The operator enters the mail post communication time hh:mm sequentially by the ten-key 42. Then, a message "One time only or daily? Enter 1 for one time only and 2 for daily." is indicated on the display unit. The operator enters 1 or 2 by the ten-key 42. Then, a message "Enter destination station." is indicated on the display unit. The operator enters the destination station by the ten-key 42, the one-touch dial 44 or the preset dial 46 followed by two digits by the ten-key 42. Those contents are stored in the circuit 40. When the time hh:mm of one time only or daily is reached, the image data stored in the memory 14 corresponding to the mail post communication number is collectively sent to the destination station by the mail post communication. If the mail post communication registration is determined to have been selected in S68, the mail post communication time, the implementation condition (one time only or daily) and the mail post communication destination station corresponding to the mail post communication number are registered (step S70) as described above. If the mail post communication registration is determined not to have been selected in the step S68, the process proceeds to a step S72.

In the step S72, whether the mail post communication has been selected or not is determined. If it has, the mail post communication selection button 34 is depressed and the mail post communication lamp 36 is turned on. Then, a message "Enter mail post communication number" is indicated on the display unit. The operator enters the number 1 to 5 to enter the mail post communication number. The mail post communication destination station, the communication time and the implementation condition (one time only or daily) are indicated on the display unit. The operator confirms it and depresses a start key. Then, the storage of the image data to the memory circuit 14 is started. The information number is assigned to each of the mail post communication numbers and the number of read documents is stored for each information number (step S74). If the mail post communication is not selected, the process proceeds to a step S76.

In the step S76, whether the mail post polling transmission has been selected or not is determined. In the mail post polling registration, the destination station telephone number and the approximate communication time corresponding to the mail post polling transmission number are registered. When the mail post polling transmission registration button 54 is depressed, a message "Enter mail post polling transmission number." is indicated on the display unit, not shown. The operator enters the number 1 to 5 by the ten-key 42 to enter the mail post polling transmission number. Then, a message "Enter destination station telephone number." is indicated on the display unit. The operator enters the destination station of the mail post polling transmission by the ten-key 42. Then, a message "Enter mail post polling time." is indicated on the display unit. The operator enters the approximate time of the mail post polling by the ten-key 42. Those contents are stored in the circuit 56. When the mail post polling transmission registration is determined to have been selected in the step S76, the destination station telephone number and the approximate time of the mail post polling transmission corresponding to the mail post polling transmission number are registered (step S78) as described above. If the mail post polling transmission registration is determined not to have been selected, the process proceeds to a step S80 of FIG. 3A.

In the step S80 of FIG. 3A, the information stored in the circuit 40 is entered to determine whether the communication time for any of the mail post communication numbers has been reached and whether the image data for the mail post communication corresponding to that mail post communication number is stored in the memory circuit. If the decision in the step S80 is yes, the step proceeds to a step S86, and if the decision is no, the process proceeds to a step S82.

In the step S82, whether the reception has been selected or not is determined. If it has, the process proceeds to a step S116 of FIG. 5A, and if it has not, the process proceeds to a step S208 of FIG. 4A.

On the other hand, in the step S86, a signal of the signal level "1" is supplied to the signal line 58a to turn on the CML. In a step S88, dial information is supplied to the signal line 58e and a call request pulse is generated on the signal line 58f to call the destination station of the designated mail post communication number.

In a step S90, a pre-protocol is conducted. In a step S92, whether the destination receiving station has a function of displaying the periodic mail post communication or not is determined. If it has, the process proceeds to a step S94, and if it does not have, the process proceeds to a step S107.

In the step S94, whether the destination receiving station has a dual communication function or not is determined. If it has, the process proceeds to a step S96, and if it does not have, the process proceeds to a step S106.

In the step S96, the remaining pre-protocol is conducted. The availability of the dual mode, the transmitting station telephone number and the daily time of the mail post communication are informed to the destination receiving station.

In a step S98, whether the dual communication operation has been selected or not by the receiving station is determined. If it has, the process proceeds to a step S100, and if it has not, the process proceeds to a step S110.

In the step S100, the image signal is transmitted, and in the step S102, the image signal is received. Both include protocol operations.

In a step S104, whether the transmission and the reception of the image signal have been completed or not is determined. If they have, the process proceeds to the step S62 of FIG. 2, and if they have not, the process proceeds to the step S100.

In the step S106, the remaining pre-protocol is conducted. The transmitting station telephone number and the daily time of the mail post communication are informed to the destination receiving station.

When the process proceeds from the step S92 to the step S107, whether the destination receiving station has a dual communication function or not is determined, and if it has, the process proceeds to a step S108, and if it does not have, the process proceeds to the step S110.

In the step S108, the remaining pre-protocol is conducted. The availability of the dual mode operation and the transmitting station telephone number are informed to the destination receiving station.

In a step S109, whether the dual communication mode has been selected by the destination receiving station or not is determined. If it has, the process proceeds to the step S100, and if it has not, the process proceeds to the step S110.

In the stp S110, the remaining pre-protocol is conducted. In a step S112, the image signal is transmitted. After the image signal has been transmitted, the post protocol is conducted in a step S114 and the process returns to the step S62 of FIG. 2.

Figure 5A:
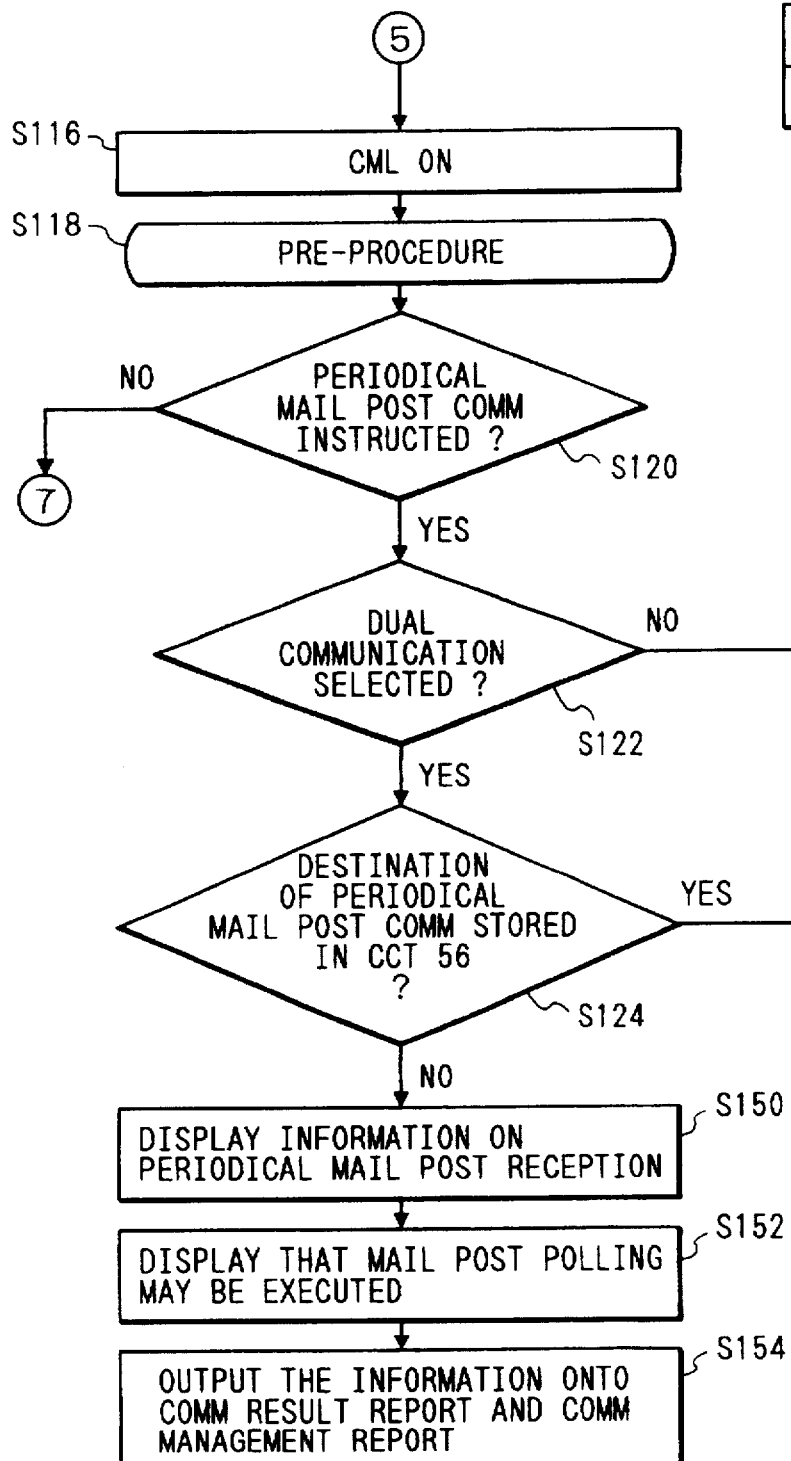
Figure 5:
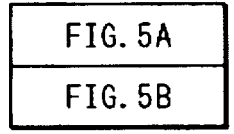
Figure 5B:
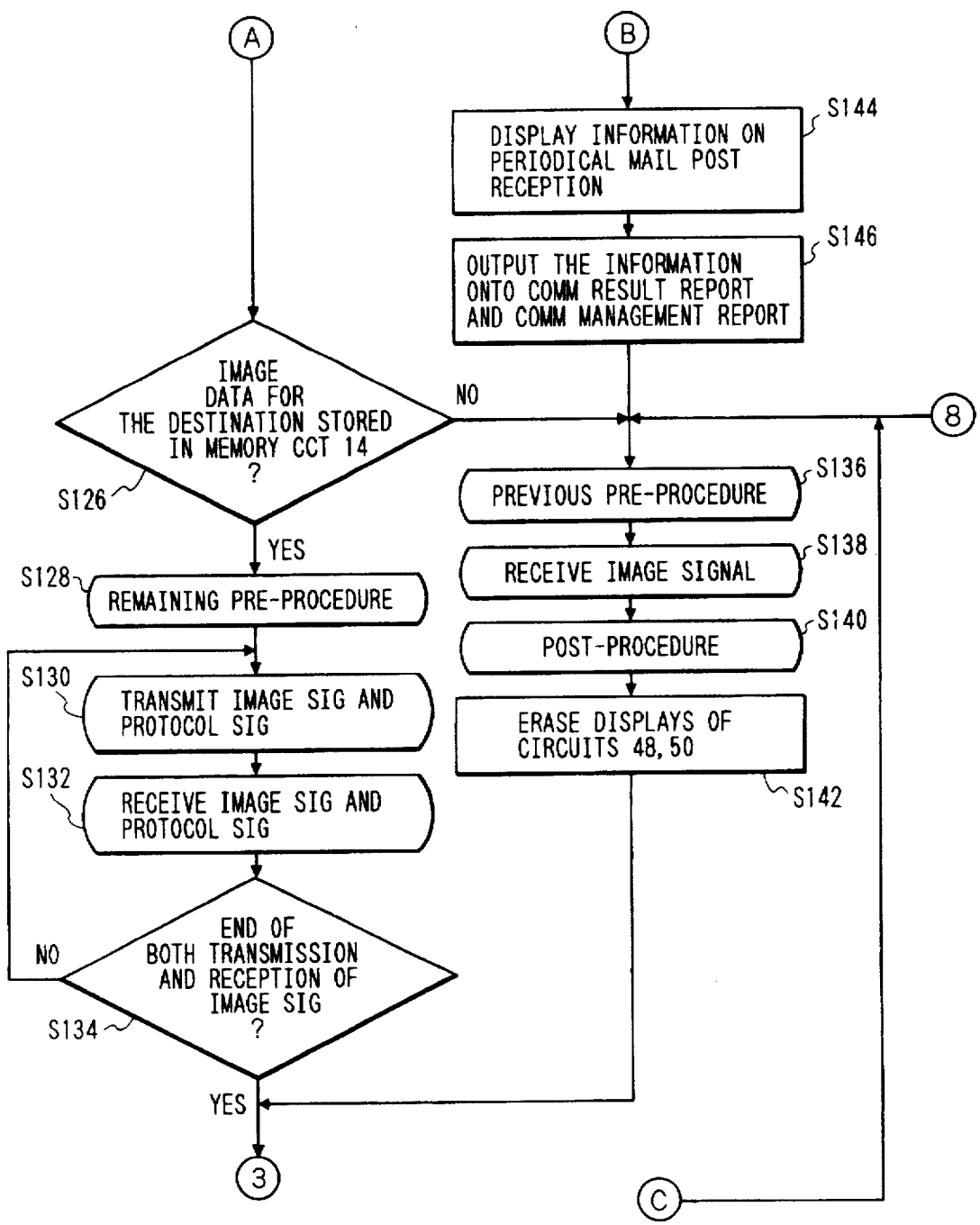

When the process proceeds from the step S82 to a step S116 of FIGS. 5A and 5B, a signal of the signal level "1" is supplied to the signal line 58a to turn on the CML.

In a step S118, the pre-protocol is conducted. The availability of the periodic mail post communication display function of the transmitting station and the availability of the dual communication function are informed.

In a step S120, whether the periodic mail post communication has been indicated or not is determined. If it has, the process proceeds to a step S122, and if it has not, the process proceeds to a step S244 of FIG. 6.

In the step S122, whether the dual communication has been selected or not is determined. If it has, the process proceeds to a step S124, and if it has not, the process proceeds to a step S144.

In the step S124, whether the telephone number of the destination station of the periodic mail post communication which is now being connected to the line is stored in the circuit 56 or not is determined. Whether it is stored, the process proceeds to a step S126, and if it is not, the process proceeds to a step S150.

In the step S126, the mail post polling transmission number of the circuit 56 is determined from the telephone number of the destination station of the mail post communication. Whether the data of the mail post polling transmission number is stored in the memory circuit 14 or not is determined. If it is, the process proceeds to a step S128, and if it is not, the process proceeds to a step S136.

In the step S128, the remaining pre-protocol is conducted. The mail post polling in the dual mode is informed to the transmitting station.

In a step S130, the image signal is transmitted. In a step S132, the image signal is received. The steps S130 and S132 include protocol operations.

In a step S134, whether the reception and the transmission of the image signal have been completed or not is determined. If they have, the process proceeds to the step S62, and if they have not, the process proceeds to a step S130.

When the process proceeds from the step S126 to the step S136, the remaining pre-protocol is conducted. In a step S138, the image signal is received and in a step S140, the post protocol is conducted.

In a step S142, the display of the circuits 48 and 50 is tunred off through signal lines 58l and 58m and the process returns to the step S62 of FIG. 2.

When the process proceeds from the step S122 to the step S144, the periodic mail post reception mode, the daily time and the destination station telephone number are indicated to the circuit 48 through the signal line 58l.

In a step S146, the daily time for the mail post communication and the destination station telephone number are supplied to the communication result report and the communication management report.

When the process proceeds from the step S124 to the step S150, the periodic mail post reception mode, the daily time and the destination station telephone number are indicated to the circuit 48 through the signal line 58l.

In a step S154, the availability of the mail post polling to the mail post communication, the daily time and the destination station telephone number are supplied to the communication result report and the communication management report. Then, the process proceeds to the step S136.

Figure 3B:
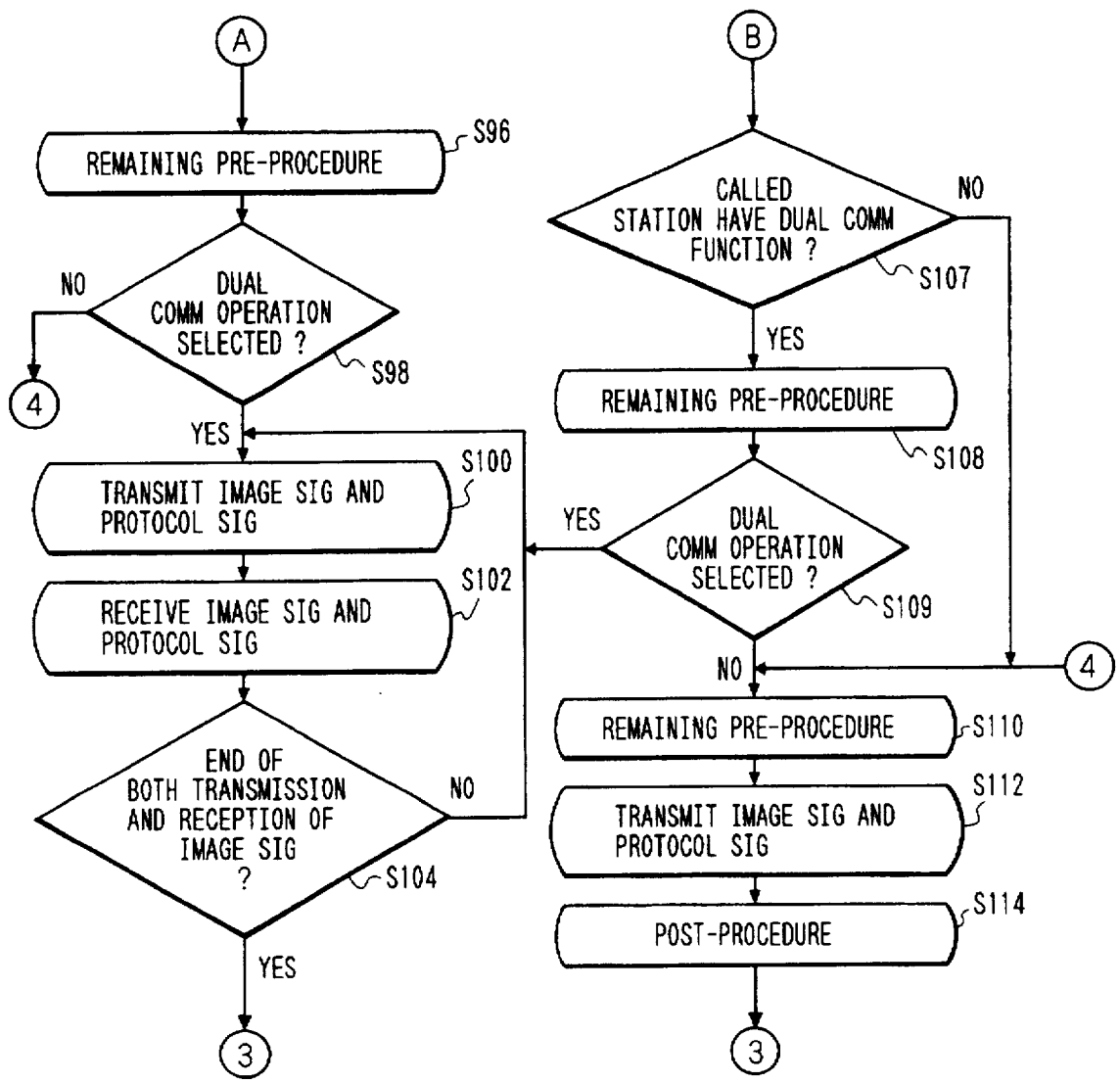

When the process proceeds from the step S82 of FIGS. 3A and 3B to the step S208 of FIGS. 4A and 4B, whether the stored transmission has been selected or not is determined, and if it has, the process proceeds to the step S210, and if it has not, the process proceeds to a step S240.

In the step S210, whether all 16 bits of the stored transmission reservation map are "1" or not, that is, whether 16 stored transmissions have been reserved or not is determined. If they are, the process proceeds to a step S222, and if they are not, the process proceeds to a step S212.

In the step S222, the timer n corresponding to a destination station number n is checked for the timeout in the ascending order of n. That is, whether the timer 1 is timed out or not is first determined. If it is, the process proceeds to a step S224 and if it is not, whether the timer 2 is timed out or not is determined. Similarly, the timer 3, the timer 4, . . . . the timer 16 are sequentially checked. If all timers n (n=1 to 16) are not timed out, the process proceeds to a step S239. If the timer 3 is timed out, the number n is set to 3 and the process proceeds to a step S224.

In the step S224, a signal of the signal level "1" is supplied to the signal line 58a to turn on the CML.

In the step S226, the destination station in which the destination station number n is stored is called by the call circuit 30.

In a step S228, the pre-protocol is conducted. In a step S230, image data to be transmitted is designated by the signal line 58p and the image signal stored in the memory circuit 14 is transmitted to the destination station n.

In a step S232, the post protocol is conducted. In a step S234, a signal of the signal level "0" is supplied to the signal line 58a to turn off the CML.

In a step S236, the information of the memory stored for the destination number n is erased through the signal line 58p. In a step S238, the n-th bit from the least significant bit of the stored transmission reservation map is set to "0". The process then proceeds to a step S239 to conduct the other process, and the process proceeds to the step S68 of FIG. 2.

When the process proceeds from the step S210 to the step S212, the 16 bits of the stored transmission reservation map are checked in the ascending order to detect the "0" bit. The bit position or the number of bits n of the "0" bit from the lowest order bit is counted.

In a step S214, the destination station telephone number corresponding to the number n is stored. The number n is the destination station telephone number.

In a step S216, a document sheet is read and image data is stored in the memory circuit 14. The image data is stored in association with the destination station number n.

In a step S218, the n-th bit from the lowest order of the stored transmission reservation map is changed from "0" to "1".

In a step S220, one hour is set to the timer n and the timer n is started.

Figure 6:
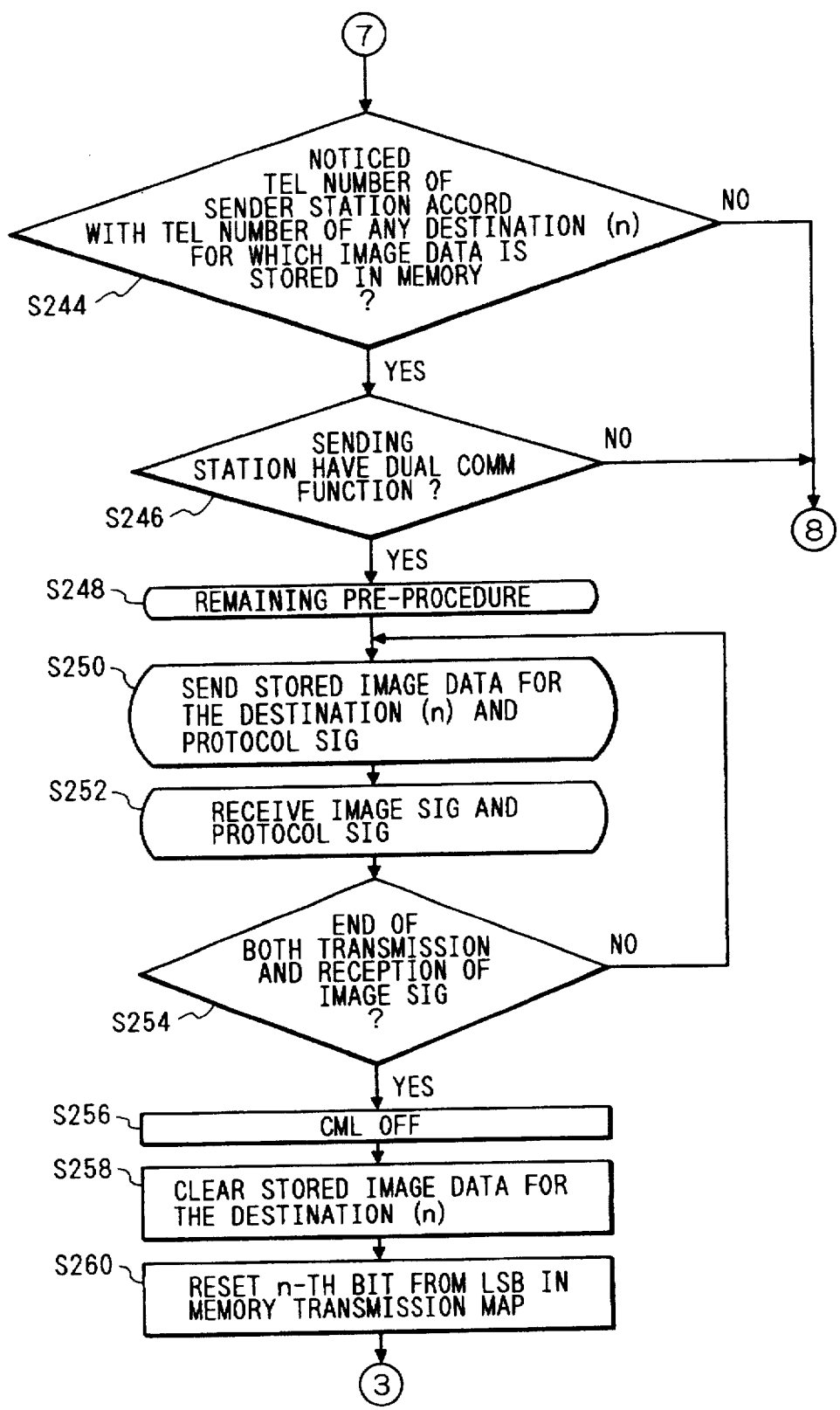
FIG. 6 shows a flow chart of a control operation of a control circuit of the embodiment.

When the process proceeds from the step S120 of FIG. 5A to the step S244 of FIG. 6, whether the destination station number (received by the TSI) matches to any one of the destination station numbers having the image data stored in the memory. If it matches, the process proceeds to a step S246. On the other hand, if it does not match, the process proceeds to a step S136 of FIG. 5B.

In a step S246, whether the transmitting station is capable of dual communication or not is determined. If it is, the process proceeds to a step S248 and if it is not, the process proceeds to the step S136 of FIG. 5B.

In the step S248, the remaining pre-protocol is conducted. In a step S250, the image data stored in the memory corresponding to the matched destination station is transmitted.

In a step S252, the image signal is received. In the steps S250 and S252, a facsimile protocol is conducted.

In a step S254, whether the transmission and the reception of the image signal have been completed or not is determined. If they have, the process proceeds to a step S256 and if they have not, the process proceeds to a step S250.

When the step proceeds to the step S256 after the transmission and the reception of the image signal, a signal of the signal level "0" is supplied to the signal line 58a to turn off the CML.

In a step S258, the information of the memory stored for the destination satiation number n is erased.

In a step S260, the information of the n-th bit from the lowest order of the stored transmission reservation map is set to "0" and the process proceeds to the step S62 of FIG. 2.

(Embodiment 2)

In the above embodiment, when the periodic mail post communication mode is informed by the protocol signal in the transmission of the image signal, a command pulse indicating the mail post communication may be generated on the signal line 58c and the mail post communication mode may be indicated by the image signal.

(Embodiment 3)

In the mail post reception mode, when the output the communication result report or the communication management report is selected, the mail post reception mode, the daily time, and the destination station telephone number, or the availability of the mail post polling for the mail post reception, the daily time and the destination station telephone number, that is, those stored in the steps S146 and S154 of FIG. 2 are supplied.

(Embodiment 4)

When the mail post polling transmission is selected, the matching to the approximate time registered in the circuit 56 is checked, and the mail post polling may be conducted. For example, the approximate time may be in ±1 hour of the time registered in the circuit 56.

Specifically, a decision step is inserted between the Yes of the step S126 and the step S128 and if the matching to the approximate time is determined by the decision step, the process proceeds to the step S128 to conduct the mail post polling, and if the matching to the approximate time is not detected, the process proceeds to the step S136 to stop the mail post polling transmission.

(Embodiment 5)

When there is no information for the mail post transmission in the transmitting station and the mail post transmission is not conducted and there is data to be transmitted in the mail post polling mode in the receiving station and if a predetermined time, for example, one hour has elapsed from the time at which the mail post polling transmission is to be conducted, the receiving station may be called and the data for the mail post polling may be transmitted. In this case, the dual mode is not conducted.

In accordance with the present invention, where the periodic reception is conducted in the normal reception mode (which is not the reception between the facsimile apparatus capable of the dual mode operation), it is indicated. Accordingly, the operator at the receiving station will not conduct the timer transmission at that time so that the possibility of line busy is reduced and the possibility of non-establishment of the communication is reduced.

On the other hand, when the periodic reception is conducted in the reception mode of the facsimile apparatus capable of the dual mode operation in both the transmission and the reception, it is informed together with the availability of the reverse channel. Accordingly, when the periodic reception from the operator is conducted and the transmission of the information over the reverse channel is selected, two channels may be effectively utilized. Thus, the facsimile apparatus capable of the dual mode operation can be effectively utilized.

The standardization of the full duplex communication modem over 14.4 kb/s is in progress in V-fast by the CCITT SG 17. The common use of a facsimile apparatus capable of the full duplex communication is expected in future and the present invention will be effective in such an environment.

What is claimed is:

1. A data communication apparatus having a periodic communication mode comprising:

means for selecting a periodic communication mode for performing a first selected periodic communication with a selected destination, wherein, in the periodic communication mode, said apparatus transmits data to the selected destination at a predetermined time;

means, operative when the periodic communication mode is selected, for informing the selected destination that the first selected periodic communication is to be conducted; and means, operative in response to reception of information from another data communication apparatus that a second selected periodic communication is to be conducted at a second time, for indicating to an operator at said apparatus that the second selected periodic communication is to be conducted at the second time.

2. A data communication apparatus according to claim 1, wherein said informing means informs the selected destination by indicating the first selected periodic communication in image data.

3. A data communication apparatus according to claim 1, wherein said informing means informs the selected destination by using a protocol signal for data communication.

4. A data communication apparatus according to claim 1, further comprising indication means for indicating reception of a notice received from the selected destination that the periodic communication is currently being performed.

5. A data communication apparatus according to claim 4, wherein said indication means records the reception of the notice in a communication result report and in a communication management report when the notice is received.

6. A data communication apparatus according to claim 1, wherein the periodic communication mode is periodic mail post communication.

7. A data communication apparatus according to claim 1, further comprising dual communication operation means for performing a dual communication operation including concurrent reception and transmission, and means for informing the selected destination whether the dual communication operation is available or not.

8. A data communication apparatus according to claim 7, wherein both said apparatus and the selected destination are capable of performing the dual communication operation, said apparatus indicating reception of a notice that periodic communication is currently being performed when the notice is received and further indicates that reverse communication is available.

9. A data communication apparatus according to claim 8, further comprising manually operable registration means for inputting and registering a reverse communication indication following an indication of availability of reverse communication in the selected destination when periodic communication is conducted, said apparatus conducting reverse communication when reverse communication to the selected destination is indicated.

10. A method for controlling a first data communication apparatus having a periodic communication mode comprising:

a selecting step of selecting a periodic communication mode for performing a first selected periodic communication with a selected destination, wherein, in the periodic communication mode, the first data communication apparatus transmits data to the selected destination at a predetermined time;

an informing step, operative when the periodic communication mode is selected, of informing the selected destination that the first selected periodic communication is to be conducted; and an indicating step, operative in response to reception of information from another data communication apparatus that a second selected periodic communication is to be conducted at a second time, for indicating to an operator at the first data communication apparatus that the second selected periodic communication is to be conducted at the second time.

11. A method according to claim 10, wherein said informing step informs the selected destination by indicating the first selected periodic communication in image data.

12. A method according to claim 10, wherein said informing step informs the selected destination by using a protocol signal for data communication.

13. A method according to claim 10, further comprising an indication step of indicating reception of a notice received from the selected destination that the periodic communication is currently being performed.

14. A method according to claim 13, wherein said indication step records the reception of the notice in a communication result report and in a communication management report when the notice is received.

15. A method according to claim 10, wherein the periodic communication mode is periodic mail post communication.

16. A method according to claim 10, wherein the first data communication apparatus includes dual communication operation means for performing a dual communication operation including concurrent reception and transmission, said method further comprising a second informing step of informing the selected destination whether the dual communication operation is available or not.

17. A method according to claim 16, wherein both the first data communication apparatus and the selected destination are capable of performing the dual communication operation, said method controlling the first data communication apparatus to indicate reception of a notice that periodic communication is currently being performed when the notice is received by the first data communication apparatus and further to indicate that reverse communication is available.

18. A method according to claim 17, further comprising a registration step, using manually operable registration means, of inputting and registering a reverse communication indication following an indication of availability of reverse communication in the selected destination when periodic communication is conducted, said method controlling the first data communication apparatus to conduct reverse communication when reverse communication to the selected destination is indicated.

* * * * *

UNITED STATES PATENT AND TRADEMARK OFFICE
CERTIFICATE OF CORRECTION

PATENT NO. : 5,748,714

DATED : May 5, 1998

INVENTOR(S) : TAKEHIRO YOSHIDA

It is certified that error appears in the above-identified patent and that said Letters Patent is hereby corrected as shown below:

COLUMN 1

Line 51, "priodic" should read --periodic--.

COLUMN 2

Line 15, "pre sent" should read --present--; and
    Line 26, "11"," should read --"1",--.

COLUMN 5

Line 18, "receiving" should read --sending--.

COLUMN 10

Line 12, "satiation" should read --station--.

Signed and Sealed this

First Day of December, 1998

Attest:

*Attesting Officer*

BRUCE LEHMAN

*Commissioner of Patents and Trademarks*